(No Model.)
J. W. PAIGE.
PNEUMATIC TIRE.
No. 562,650. Patented June 23, 1896.
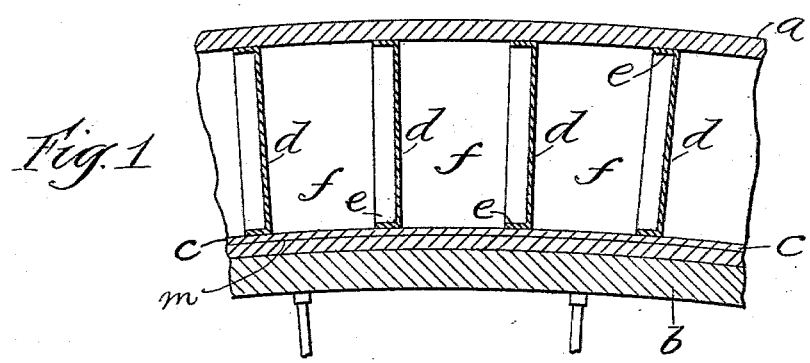
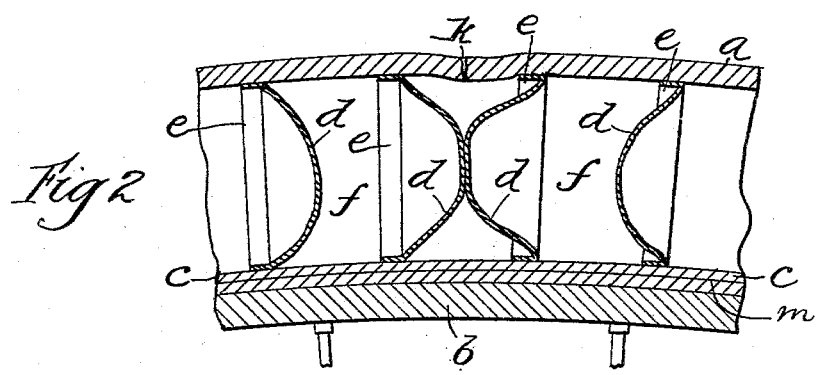
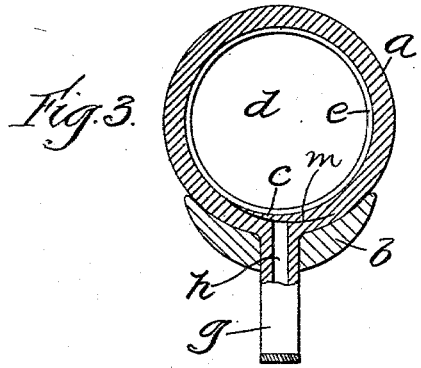
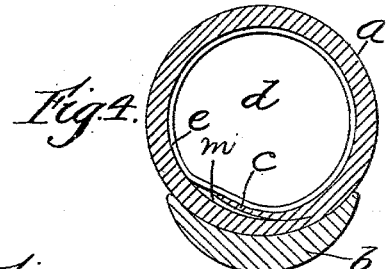
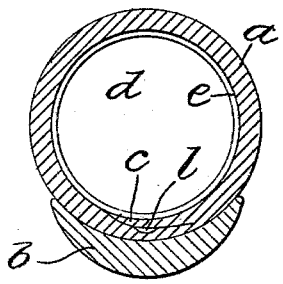
Witnesses
Wm. F. Henning
Florence Embrey
Inventor
James W. Paige
by David H. Fletcher
Atty.

UNITED STATES PATENT OFFICE.

JAMES W. PAIGE, OF CHICAGO, ILLINOIS.

PNEUMATIC TIRE.

SPECIFICATION forming part of Letters Patent No. 562,650, dated June 23, 1896.

Application filed August 17, 1895. Serial No. 559,579. (No model.)

*To all whom it may concern:*

Be it known that I, JAMES W. PAIGE, of Chicago, in the county of Cook and State of Illinois, have invented certain new and useful Improvements in Pneumatic Tires, of which the following is a full, clear, and exact description, reference being had to the accompanying drawings, forming a part of this specification, in which corresponding letters of reference in the different figures indicate like parts.

The object of my invention is to so construct a pneumatic tire having separate compartments therein that the air may be admitted through a single valve to the several compartments under uniform pressure and retained therein without the intervention of complicated valves or a separate tube, so that a puncture of the tire in any given place will permit the air to escape from none of the compartments except that with which the puncture communicates.

To this end my invention consists in a closed or endless tube provided within its walls with a normally-closed air passage-way, preferably in the form of an interior annular flap, loose at one edge, in combination with a series of flexible partitions, cemented or otherwise secured with air-tight joints within the tube, and a valveless inflating-tube attached to the outer wall of said tire or cushion-tube and in communication with said air passage-way, all of which is hereinafter more particularly described and claimed.

In the drawings, Figure 1 is a longitudinal sectional view of a portion of a pneumatic tire embodying the features of my invention. Fig. 2 is a like view indicating the result which would ensue from puncturing one of the compartments. Fig. 3 is a transverse sectional view cut through the inflating-valve. Fig. 4 is a transverse sectional view of the tire, indicating the manner in which the flap rises for the admission of air to the respective compartments when the tire is being inflated. Fig. 5 is a like view showing a modification of said invention.

Referring to the drawings, *a* represents an endless pneumatic tube, constructed of rubber and canvas, or in any well-known manner, so as to render it sufficiently flexible and non-expansible and to withstand the requisite pressure, while *b* indicates the usual felly of a bicycle-wheel.

In forming the tire the folds are overlapped and cemented, so that while the tube as a whole is air-tight, there is formed therein a loose interior annular flap *c*. Located within the tube at suitable distances from each other are a series of flexible partitions *d*, preferably formed from india-rubber, and which are, by preference, provided with annular flanges *e*, which are cemented to the interior of the tube *a*, including the flap *c*, as is more clearly shown in Figs. 3 to 5, inclusive, thereby forming within the tube a series of normally-closed separate air-tight compartments *f*. Attached to or formed upon the outer shell of the tire is a nipple *g*, Fig. 3, the passage *h* of which communicates directly with the space between the flap *c* and the outer wall, with which said flap is normally in contact. It is obvious that said nipple, which may be constructed or attached in any well-known way, need not be provided with a check-valve, inasmuch as the flap closes from the pressure within as soon as the outward pressure ceases.

When the air-pump is attached to the nipple and the air is forced into the passage-way *h*, it raises the flap *c*, as shown in Fig. 4, and continues to pass thereunder throughout the length of the entire tube, flowing into the respective compartments with equal pressure as long as the air-pump is operated. Upon stopping the pump the outward pressure of the air from within the tube effectually closes the flap and retains the air within the respective compartments, so that it cannot communicate from one to the other. In case the tire becomes punctured, as shown at *k*, Fig. 2, the air escapes from that compartment and the removal of the pressure therefrom causes the flexible partitions *d* to so expand as to practically fill the space in the manner indicated.

In Fig. 5 I have shown a modified construction, in which a groove *l* is formed in the rim beneath the flap, so as to provide a channel for the air to pass from the induction-tube to the several compartments. I prefer the former construction, however, though it is obvious that in neither can there be a back flow of air when the tube is inflated.

Having thus described my invention, I claim—

The combination in a pneumatic tire, of a tube having an interior annular flap integral with and forming a part of the wall of the tube, said flap extending continuously throughout the length of the tube, a series of flexible partitions secured within the tube, and an inflating-tube extending through the outer body of the tube and against said annular flap, whereby, when air is forced into the inflating-tube under pressure, it may temporarily separate the flap from the main body of the tube throughout its length and escape laterally into the respective compartments, substantially as specified.

In testimony whereof I have signed this specification, in the presence of two subscribing witnesses, this 14th day of August, 1895.

JAMES W. PAIGE.

Witnesses:
D. H. FLETCHER,
FLORENCE EMBREY.